United States Patent
Shimamoto et al.

(10) Patent No.: US 6,621,684 B2
(45) Date of Patent: Sep. 16, 2003

(54) ELECTRIC DOUBLE LAYER CAPACITOR, ELECTROLYTIC SOLUTION THEREFORE AND METHOD FOR SUPPRESSING SELF-DISCHARGE IN ELECTRONIC COMPONENT

(75) Inventors: Hideki Shimamoto, Kyoto (JP); Yoshinori Takamuku, Kyoto (JP); Yukiya Kobayashi, Kyoto (JP); Minako Fujiyoshi, Kyoto (JP)

(73) Assignees: Matsushita Electric Insustrial Co. Ltd., Osaka (JP); Sanyo Chemical Industries, Ltd., Kyoto (JP)

( * ) Notice: Subject to any disclaimer, the term of this patent is extended or adjusted under 35 U.S.C. 154(b) by 36 days.

(21) Appl. No.: 09/883,215

(22) Filed: Jun. 19, 2001

(65) Prior Publication Data

US 2002/0036884 A1 Mar. 28, 2002

(30) Foreign Application Priority Data

Jun. 19, 2000 (JP) ....................... 2000-182774

(51) Int. Cl.[7] .............................................. H01G 9/035
(52) U.S. Cl. ...................... 361/502; 29/25.03; 252/62.2
(58) Field of Search ......................... 361/502, 503–507, 361/512, 525, 526; 29/25.03; 252/62.2

(56) References Cited

U.S. PATENT DOCUMENTS 5,455,760 A * 10/1995 Bilas et al. .................... 700/22
5,870,275 A 2/1999 Shiono et al.

FOREIGN PATENT DOCUMENTS

| JP | 7-74060 | 3/1995 | |
|---|---|---|---|
| JP | 11-149825 | 6/1999 | |
| JP | 11-176701 | 7/1999 | |
| JP | WO99/59173 | * 11/1999 | ............ H01G/9/02 |

* cited by examiner

Primary Examiner—Dean A. Reichard
Assistant Examiner—Eric W. Thomas
(74) Attorney, Agent, or Firm—Connolly Bove Lodge & Hutz LLP (57) ABSTRACT

Electric double layer capacitors having improved stability of electrochemical properties and improved retention of residual voltage, imparted by using an electrolytic solution containing a polymer, such as acrylonitrile/stryrene copolymer, giving an increased electrolyte ion difusion resistance are provided. The capacitors are useful for electro-storage devices, such as back-up power source for real time clocks. The polymer is useful for suppressing self discharge in electronic components, such as electric double layer capacitor, aluminum electrolytic capacitors, electrochemical capacitor and secondary batteries.

36 Claims, 1 Drawing Sheet

FIG. 1

ELECTRIC DOUBLE LAYER CAPACITOR, ELECTROLYTIC SOLUTION THEREFORE AND METHOD FOR SUPPRESSING SELF-DISCHARGE IN ELECTRONIC COMPONENT

BACKGROUND OF THE INVENTION

1. Field of the Invention

This invention relates to electronic components. More particularly, it relates to electric double layer capacitors, suitable for electro-storage devices, such as back-up power source for real time clocks.

2. Description of the Prior Art

Heretofore, there have been known electrochemical components such as aluminum electrolytic capacitors, electric double layer capacitors and electrochromic display devices, containing an electrolyte solution comprising a quaternary salt of an amidine compound (Shiono et al, U.S. Pat. No. 5,870,275).

SUMMARY OF THE INVENTION

It is an object of the present invention to provide an electric double layer capacitor having an improved stability of electrochemical properties.

It is another object of this invention to provide an electric double layer capacitor having a suppressed self-discharge.

It is still another object of the invention to provide an electric double layer capacitor having increased build-up capacity of electric charge.

It is yet another object of the invention to provide an electrolytic solution, having improved electrochemical stability, suitable for use in electronic components.

It is further object of the invention to provide a method for suppressing self-discharge in an electronic component.

Briefly, these and other objects of this invention as hereinafter will become more readily apparent have been attained broadly by an electric double layer capacitor, containing an electrolytic solution (A) comprising an electrolyte, a solvent and a polymer (I) dissolved therein.

The electrolytic solution (A) has an electrolyte ion diffusion resistance (R) higher than an electrolyte ion diffusion resistance ($R_0$) of an electrolytic solution ($A_0$) composed of the electrolyte and the solvent without the polymer (I). The electrolyte ion diffusion resistances (R) and ($R_0$) are determined in accordance with alternating impedance method, at 25 C. under conditions of bias of 2.5 V and alternating voltage of 5 mV varying alternating frequency from 1 mHz to 20 kHz.

The polymer (I) has a weight-average molecular weight of at least about 2,000 or a polymerization degree of at least 4.

In another aspect, this invention embraces an electrolytic solution ($A_1$) comprising an electrolyte, a solvent and a polymer (I) dissolved therein.

The electrolytic solution ($A_1$) having an electrolyte ion diffusion resistance ($R_1$) higher than an electrolyte ion diffusion resistance ($R_0$) of an electrolytic solution ($A_0$) composed of the electrolyte and the solvent without said polymer (I). $R_1$ and $R_0$ are determined, in the same manner as above, with use of an electric double layer capacitor containing an electrolytic solution between activated carbon electrodes faced each other separated with a separator.

In still another aspect of the invention, is provided a method for suppressing self-discharge in an electronic component containing an electrolytic solution. This method comprises incorporating in the electrolytic solution a polymer (I) to be dissolved therein. The polymer (I) provides an electrolytic solution ($A_2$) composed of 2% by weight of said polymer (I), 10% by weight of tetraethylammonium tetrafluoroborate and 88% by weight of propylene carbonate and having an electrolyte ion diffusion resistance ($R_2$) higher than an electrolyte ion diffusion resistance ($R_0$) of an electrolytic solution ($A_0$) composed of the electrolyte and the solvent without said polymer (I). $R_2$ and $R_0$ are determined, in the same manner as above using the same capacitor as above.

DETAILED DESCRIPTION OF THE PREFERRED EMBODIMENTS (I) Polymers

Suitable polymers (I), used in the present invention, are inclusive of organic polymers, such as vinyl polymers, polyalkylene ethers, polyurethanes, polyesters, polyamides, polycarbonates, polyphenylene ethers, polysulfones, phenolic resins, xylene resins, urea resins, melamine resins and natural organic polymers; and inorganic polymers; as well as mixtures of two or more these polymers.

(I1) Vinyl Polymers

Suitable vinyl polymers include, for example, ones comprised of one or more of vinyl monomers as follows:

(a) unsaturated hydrocarbon monomers:

(a1) aliphatic vinyl hydrocarbon monomers, for example, alkenes [C (number of carbon atoms) 2–30 or more preferably C2–4], such as ethylene, propylene, 1-butene, isobutylene, pentenes, heptenes, diisobutylene, octenes, dodecenes, octadecenes and αolefines containing 20–30 carbon atoms; and alkadienes (C4–18 or more preferably C4–5), such as butadiene, isoprene, 1,4-pentadiene, 1,6-hexadiene and 1,7-octadiene; (a2) cycloaliphatic vinyl hydrocarbon monomers, including ones (C5–24), for example, cycloalkenes, such as cyclohexene; (di)cycloalkadienes, such as (di)cyclopentadienes; polyvinyl cycloaliphatic hydrocarbon monomers, such as vinylcyclohexene, ethylidenebicycloheptene; and terpenes, such as pynene and limonene; (a3) aromatic vinyl hydrocarbon monomers, including styrene, and substituted styrenes, having one or more hydrocarbyl (C1–18 or more) substitutents, for example, mono- and di-alkylstyrenes, such as α-methylstyrene, vinyltoluenes, 2,4-dimethyl-styrene, ethylstyrenes, iso-propylstyrenes, butylstyrenes and crotylbenzene; cycloalkylstyrenes, such as cyclohexyl-styrenes; arylstyrenes, such as phenyl-styrenes; aralkylstyrenes, such as benzylstyrenes; and divinyl aromatic hydrocarbons, such as divinylbenzenes, divinyltoluenes and divinyxylenes; and other aromatic vinyl hydrocarbon monomers, such as vinylnaphthalenes and indene;

(b) carboxyl-containing vinyl monomers:

(b1) ethylenically unsaturated monocarboxylic acids, such as (meth)acrylic acids (representing acrylic acid and/or methacrylic acid; similar expressions being used herein-after), (iso)crotonic and cinnamic acids; (b2) ethylenically unsaturated dicarboxylic acids, such as maleic, fumaric, itaconic, citraconic and mesaconic acids; (b3) ethylenically unsaturated polycarboxylic acids having 3–4 or more carboxyl groups, such as aconitic acid; (b4) monoalkyl (C1–18) esters of (b2) or (b3), such as monomethyl maleate; and (b5) anhydrides of (b2) or (b3), such as maleic and itaconic anhydrides; as well as salts of (b1)–(b4) with a base, for example, alkali metals, such as sodium and potassium; alkaline earth metals, such as magnesium and calcium; other metals, such as zinc; ammonium; primary, secondary and tertiary amines, such as mono-, di- and tri-hydroxyalkyl (C2–4) and/or alkyl (C1–4) amines (e.g. mono-, di- and tri-ethanol amines, trimethyl amine and triethyl amine) and heterocyclic amines (e.g. morpholine); and quaternary ammoniums, such as tetraalkyl (C1–18) ammoniums;

(c) hydroxyl-containing vinyl monomers:
(c1) hydroxyl-substituted alkenes (C2–8), for example, alkenols, such as (meth)allyl alcohols, (iso)crotyl alcohols, 1-butene-3-ol and 2-butene-1-ol; alkene diols, such as 2-butene-1-4-diol; (c2) hydroxyl-substituted alkynes (C2–8), such as propargyl alcohol; (c3) hydroxyl-substituted aromatic unsaturated monomers, such as hydroxy-styrenes; (c4) hydroxyl-containing esters of unsaturated carboxylic acid [(b1)-(b3)], including hydroxyl-containing acrylic monomers, for example, (c41) hydroxyalkyl (C2–8) (meth)acrylates, such as hydroxyethyl and hydroxypropyl (meth)acrylates; (c42) mono(meth)acrylates of a polyhydric-6-alcohol (containing 3–8 or more hydroxyl groups: such as glycerol, trimethylolpropane, hexanetriols, pentaerythritol, sorbitol and sucrose); and (c43) other unsaturated carboxylic acid esters corresponding to (c41) and (c42); (c5) hydroxyalkyl (C2–8) alkenyl (C2–8) ethers, such as 2-hydroxyethyl propenyl ether; and (c6) monoalkenyl (C2–8) ethers of polyhydric alcohol as above, such as mono-(meth)allyl ethers of trimethylolpropane and of sucrose;

(d) polyoxyalkylene moiety-containing vinyl monomers: vinyl monomers containing at least one polyoxyalkylene moiety of the general formula: (A–O)n, wherein A represents one or more alkylene groups (C2–8, such as ethylene group, propylene group, 1,2-, 2,3-, 1,3- and 1,4-butylene groups, octylene group, and combinations of two or more of them) and n represents an integer of 2–100 or more showing polymerization degree of oxyalkylene units; said moiety being obtainable through ring-opening polymerization of one or more alkylene oxides (C2–8, hereinafter referred to as AO), for example, ethylene oxide, 1,2-propylene oxide and tetrahydrofuran (hereinafter referred to as EO, PO and THF, respectively), and other AOs as mentionded below in (p1), as well as combinations of two or more of AOs (random-wise and/or block-wise), such as EO/PO, EO/THF, PO/THF and EO/PO/THF:
(d1) polyoxyalkylene-containing esters of unsaturated carboxylic acid [(b1)-(b3)], for example, (d11) polyoxy-alkylene mono(meth)acrylates, such as polyoxyethylene (n=2–100) mono(meth)acrylates and polyoxypropylene (n=2–100) mono(meth) acrylates; (12) mono(meth)acrylates of polyoxyalkylene ether (AO adduct) of dihydric phenol (for example, mononuclear dihydric phenols such as hydroquinone, and bisphenols such as bisphenol A), such as polyoxyethylated (n=2–30) bisphenol A mono(meth)acrylates; (d13) mono (meth)-acrylates of polyoxyalkylene polyols containing 3–8 or more hydroxyl groups (such as alkylene oxide adduct of polyhydric alcohol as above); (d14) polyoxyalkylene alkyl (C1–20 or more) ether mono(meth)acrylates, such as methoxypolyethenoxy (n=2–100) mono (meth)acrylates and lauroxypolyethenoxy (n=2–100) mono(meth)acrylates; and (d15) esters corresponding to (d11)-(d14) of other unsaturated carboxylic acids as above; (d2) polyoxyalkylene alkenyl (C2–8) ethers, including (d21) polyoxyalkylene monoalkenyl (C2–8) ethers, such as polyoxyethylene (n=2–100) mono(meth)allyl ethers, mono(meth)allyl ethers of polyoxyalkylene polyol as above and 2-butoxy-2'-vinyloxydiethyl ether; (d22) alkyl (C1–20 or more) ethers of (d21), such as methoxypolyethenoxy (n=2–100) mono(meth)allyl ethers; (d23) esters of saturated carboxylic acid (C1–20 or more) with (d21), such as acetoxypolyethenoxy (n=2–100) mono(meth)allyl ethers;

(e) sulfur-containing anionic vinyl monomers:
(e1) sulfo-containing vinyl monomers: (e11) alkenesulfonic acids (C2–8), such as vinylsulfonic and (meth)allylsulfonic acids; (e12) sulfo-containing aromatic vinyl monomers, such as styrenesulfonic and α-methylstyrenesulfonic acids; (e13) sulfo-containing acrylic monomers, including (e131) sulfo-containing (meth)acrylates, for example, sulfoalkyl (C2–8) (meth)acrylates, unsubstituted or substituted with a hydroxyl group, such as sulfopropyl (meth)acrylates, 2-hydroxy-3-(meth) acryloyloxypropanesulfonic acid and 2-(meth) acryloyloxyethanesulfonic acid; and (e132) sulfo-containing (meth)acrylamides, unsubstituted or substituted with a hydroxyl group, such as 2-(meth) acrylamido-2-methyl-propanesulfonic and 3-(meth) acrylamido-2-hydroxypropane-sulfonic acids; and (e14) alkenyl (C2–8) alkyl (C1–18) sulfosuccinates, such as (meth)allyl alkyl (C3–18) sulfo-succinates; and
(e2) sulfate group-containing vinyl monomers: sulfates of (c1), (c41), (d11), (d12) or (d21), such as sulfates of polyoxyalkylene (n=2–30) mono (meth)acrylate and sulfates of polyoxyalkylated (n=2–30) bisphenol (e.g. bisphenol A) mono (meth)acrylate; as well as salts of (e1) or (e2) with a base as mentioned in the above (b);

(f) phosphorus-containing anionic vinyl monomers:
(f1) phosphoric group-containing vinyl monomers: phosphates of (c1), (c41), (d11), (d12) or (d21), for example, phosphates of (meth)acryloyloxyalkyl phosphates, such as 2-(meth)acryloyloxyethyl mono- and di-phosphates, 2-(meth) acryloyloxyethyl phenyl phosphates; mono- and/or di-phosphates of polyoxyalkylene (n=2–30) mono(meth)acrylate and mono- and di-phosphates of polyoxyalkylated (n=2–30) bisphenol (e.g. bisphenol A) mono(meth)acrylate; and
(f2) phosphonic group-containing vinyl monomers: (meth)acryloyloxyalkane (C2–8) phosphonic acid, such as 2-(meth)acryloyloxyethanephosphonic acid; as well as salts of (f1) or (f2) with a base as mentioned above;

(g) nitrogen atom-containing vinyl monomers:
(g1) amino-containing vinyl monomers (vinyl monomers containing a primary, secondary or tertiary amino group):

(g11) amino-containing unsaturated hydrocarbons, for example, alkenyl (C3–8) amines, such as mono- and di-(meth)allyl amines and crotylamine; and amino-containing unsaturated aromatic hydrocarbons, for example, aminostyrenes and vinylbenzyl amines, mono- and di-alkyl (C1–4)-substituted derivatives of them, such as N,N-dimethylaminostyrenes and vinylbenzyldimethylamines;

(g12) amino-containing acrylic monomers, including amino-containing (meth)acrylates and (meth)acrylamides, for example, aminoalkyl (C2–8) (meth)acrylates, such as aminoethyl (meth)acrylates and aminopropyl (meth)acrylates; N-aminoalkyl (C2–8) (meth)acrylamides, such as (meth)acrylamidoethylamines; and N-mono- and N,N-di-alkyl (C1–6)-substituted derivatives of these (meth)acrylates and (meth)acrylamides, such as dimethylaminoethyl (meth)-acrylates, diethylaminoethyl (meth)acrylates, t-butylaminoethyl (meth)acrylates, and (meth)acrylamides corresponding to these (meth)acrylates;

(g13) heterocyclic amino-containing monomers, for example, morpholinoalkyl (C2–8) (meth) acrylates, such as morpholino-ethyl (meth) acrylates; vinyl heterocyclic amines, such as 2- and 4-vinylpyridines, vinylimidazole, N-vinylpyrrole, N-vinylcarbazole, vinylthiazole, vinylindole, and vinyl-mercaptothiazole; and (g14) salts of (g11), (g12) or (g13), including inorganic acid salts, for example, hydrochlorides, hydrobromides, sulfates, nitrates, phosphates and carbonates; and organic acid salts, for example, carboxylates (C1–20), such as formate, acetate, butyrate, 2-ethylhexanoate, laurate, stearate, benzoate, oxalate, succinate, maleate, fumarate, phthalate, lactate, tartarate and salycilate; sulfonates (C1–20), such as alkanesulfonates and p-toluenesulfonate;

(g2) quaternary ammonium-containing vinyl monomers: quaternary ammonium salts of (g1), for example, quaternarizates of N,N-dialkylaminoalkyl (meth)acrylate, such as dimethylaminoethyl (meth)acrylates and diethylaminoethyl (meth)acrylates, and quaternarizates of di-(meth)allyl amines, with a quaternarizating agent, examples of which include ones having an alkyl or aralkyl goup (C1–12), such as alkyl halides (e.g. methyl chloride, methyl bromide), aralkyl halides (e.g. benzyl chloride), dialkyl sulfates (e.g. dimethyl sulfate and diethyl sulfate) and dialkyl carbonates (e.g. dimethyl carbonate);

(g3) amide group-containing vinyl monomers:
(g31) amido-containing acrylic monomers, including (meth)-acrylamides, substituted (meth)acrylamides having one or more substituents (C1–10: such as alkyl, aralkyl, aryl, hydroxyalkyl, acylalkyl and alkoxyalkyl groups), for example, N-methyl(meth) acrylamides, N-butyl(meth)acryl-amides, N,N-dimethyl(meth)acrylamides, N,N-dibenzyl(meth)-acrylamides, N-methylol(meth)acrylamides, diacetoneacryl-amide and cinnamide; (g32) heterocyclic vinylamides, such as N-vinylpyrrolidone and N-vinylthiopyrrolidone; and (g33) other amido-containing vinyl monomers, such as N-vinylformamide, N-vinylacetoamide and N-methyl-N-vinylaceto-amide;

(g4) nitrile group-containing vinyl monomers: for example, (meth)acrylonitrile, cinnamonitrile, cyanoalkyl (C3–7) (meth)acrylates such as cyanoethyl (meth)acrylates, and cyanostyrenes; and (g5) nitro group-containing vinyl monomers: such as nitrostyrenes;

(h) ether linkage-containing vinyl monomers:
(h1) vinyl ethers: ones having an alkyl, aryl or alkoxyalkyl group (C1–12), such as methyl vinyl ether, ethyl vinyl ether, n- and i-propyl vinyl ethers, butyl vinyl ether, 2-ethylhexyl vinyl ether, dodecyl vinyl ether, vinyl phenyl ether, methoxybutadiene, phenoxystyrene, p-vinylphenylphenyloxide, vinyl 2-methoxyethyl ether and vinyl 2-butoxyethyl ether;

(h2) unsaturated cyclic ethers: (h21) epoxy-containing monomers, for example, glycidyl-containing vinyl monomers, such as glycidyl (meth)acrylates, tetrahydrofurfuryl (meth)-acrylates and (meth)allyl glycidyl ethers; and (h22) alkenylene oxides, such as 3,4-dihydro-1,2-pyran;

(i) halogen-containing vinyl monomers: halo-substituted alkenes and alkadienes, such as vinyl chloride, vinyl fluoride, vinyl bromide, vinylidene chloride, vinylidene fluoride, (meth)allyl chloride, tetrafluoroethylene and chloroprene; and halo-substituted styrenes, such as mono- and di-chlorostyrenes, bromo-styrenes, chloromethylstyrenes and tetrafluorostyrenes;

(j) ester linkage-containing unsaturated monomers:
(j1) (meth)acrylic esters: (j11) alkyl (C1–50, preferably C1–20) (meth)acrylates, such as methyl, ethyl, propyl, butyl, 2-ethylhexyl, dodecyl, hexadecyl, heptadecyl and eicocyl (meth)acrylates; (j12) cycloalkyl, aralkyl and aryl (meth)acrylates, such as cyclohexyl, benzyl and phenyl (meth)acrylates;

(j2) esters of other unsaturated carboxylic acids [including monocarboxylic acids, such as (iso) crotonic, cinnamic, vinylbenzoic and alkoxy (C2–6)-substituted acrylic acids (such as α-ethoxyacrylic acid); and polycarboxylic acids, such as maleic, fumaric, itaconic, citraconic and mesaconic acids], for example, alkyl (C1–50) esters of these acids, such as ethyl α-ethoxyacrylate, methyl 4-vinylbenzoate, dimethyl fumarate and dimethyl maleate;

(j3) vinyl esters of saturated carboxylic acids [including monocarboxylic acids (C1–20), such as formic, acetic, propionic, butyric, alkoxy (C1–6) acetic and benzoic acids; and polycarboxylic acids (C2–20), such as oxalic, succinic, adipic, sebacic, phthalic, isophthalic and terephthalic acids], for example, vinyl formate, vinyl acetate, vinyl propionate, vinyl butyrate, vinyl laurate, vinyl methoxy-acetate and vinyl benzoate; and (j4) esters of other unsaturated mono-ol [such as, (meth)-allyl, isopropenyl and vinylphenyl esters] with saturated carboxylic acids as above, for example, isopropenyl acetate, acetoxy-styrene, allyl methyl phthalate and allyl ethyl adipate;

(k) vinyl ketones: ones having an alkyl or aryl group (C1–12), such as methyl vinyl ketone, ethyl vinyl ketone, dodecyl vinyl ketone and phenyl vinyl ketone;

(l) isocyanate group-containing monomers: for example, isocyanatoalkyl (C2–7) (meth)acrylates, such as isocyanatoethyl (meth)acrylates; and m-isopropenyl-α, α-dimethylmethylbenzyl isocyanate;

(m) sulfur-containing nonionic vinyl monomers: ones having an alkyl or aryl group (C1–12), for example, sulfides, such as p-vinyldiphenylsulfide and vinylethylsulfide; and sulfones, such as vinylethylsulfone; and (n) polyfunctional vinyl monomers:
  (n1) polyfunctional acrylic monomers: including (n11) poly(meth)acrylates of polyols, for example, polyhydric alcohols and polyether polyols having 2–8 or more hydroxyl groups, as described below in (q12) and (q), such as ethylene glycol di(meth)acrylates, propylene glycol di(meth)acrylates, neopentyl glycol di(meth)acrylates, trimethylolpropane tri(meth)acrylates, pentaerythritol tri(meth)acrylates, dipentaerythritol hexa(meth)acrylates, polyoxyethylene (n=1–100) di(meth)acrylates and polyoxy-ethylated (n=2–30) bisphenol A di(meth)acrylates; (meth)acrylates of (c1), such as (meth)allyl (meth)acrylates and vinyl (meth)acrylates; and (n12) bis(meth)acrylamides, such as N,N'-methylenebis(meth)acrylamide;
  (n2) ester linkage-containing polyfunctional monomers other than (n11): polyesters of other unsaturated carboxylic acids with polyols, corresponding to (n11), such as ethylene glycol dicrotonates and (meth)allyl maleates; polyesters of (c1) with saturated polycarboxylic acid (C2–20) as mentioned in (j3), such as divinyl phthalates, divinyl adipates, di(meth)allyl phthalates and di(meth)allyl adipates;
  (n3) ether linkage-containing polyfunctional monomers: polyalkenyl (C2–8) ethers of polyols as above in (n1), for example, poly(meth)allyloxyalkanes, such as di(meth)allyloxyethanes, tri(meth)allyloxyethanes, tetra(meth)allyloxyethanes, tetra(meth)allyloxypropanes, tetra(meth)allyloxybutanes, and poly(meth)allyl ethers of trimethylolpropane and of sucrose;
  (n4) polyvinyl hydrocarbon monomers: for example, aromatic polyvinyl hydrocarbon monomers, such as divinylbenzene, divinyltoluene, divinylxylene and trivinylbenzene;
  (n5) other polyfunctional vinyl monomers: for example, divinyl ketone, divinyl sulfide, divinyl sulfon and divinyl sulfoxide.

Among these monomers, preferred are (a), (g), (h1), (j), (k) and combinations of two or more of them; particularly (a1), (a2), (a3), (g3), (g4), (j11), (j3) and combinations of two or more of these, as well as combinations of at least one of these with at least one of polar monomers (b), (e), (f), (c), (h21), (d) and (i), preferably in a minor amount.

In case where two or more monomers are used, they may be copolymerzed random-wise, block-wise or graft-wise, or in combined manners (such as random-wise and then graft-wise).

Vinyl polymers, comprised of at least one monomer selected from the group consisting of (a), (g), (h1), (j) and (k) are preferred in view of solubility into electrolytic solutions and ability of imparting higher difusion resistance R.

Vinyl polymers preferably contain as structural units said monomer selected from the group consisting of (a), (g), (h1), (j) and (k), in an amount of at least 50%, particularly at least 70%, most preferably at least 90%, based on the total monomers; at least one monomer selected from the group consisting of (b), (e), (f), (c), (h21), (d) and (i), in an amount of 0–50%, particularly 0–30%, most preferably 0–10%; and at least one polyfunctional vinyl monomer (n), in an amount of 0–10%, particularly 0–3%, most preferably 0–1%.

In the above and hereinafter, % means % by weight unless otherwise specified.

Vinyl polymers may be produced using any known polymerization techniques, such as solution polymerization, suspension polymerization, bulk polymerization, emulsion polymerization, and combinations of them (for instance, solution polymerization followed by suspension or bulk polymerization, and suspension polymerization followed by solution or bulk polymerization).

Among these, preferred is solution polymerization. Suitable solvents used in solution polymerization include, for example, aromatic hydrocarbons, such as toluene, xylene and benzene; aliphatic hydrocarbons, such as n-hexane and n-octane; ketones, such as methyl ethyl ketone and methyl isobutyl ketone; esters, such as ethyl acetate and butyl acetate; and polar solvents, including those for electrolytic solutions described below, such as dimethylsulfoxide, N,N-dimethylformamide, ethylene carbonate, propylene carbonate, dimethyl carbonate and acetonitrile (hereinafter referred to as DMSO, DMF, EC, PC, DMC and ACN, respectively); as well as mixtures of two or more of these. After polymerization, the solvent may be distilled off if desired.

Polymerization can be carried out in the presence of one or more polymerization initiators, for example, azo compounds, such as azobis-iso-butyronitrile, azobis-isovaleronitrile and the like; peroxides, such as benzoyl peroxide, lauroyl peroxide, di-t-butyl peroxide, dicumyl peroxide, t-butylcumyl peroxide, t-butylperoxybenzoate, 1,1-bis(t-butylperoxy)-3,3,5-trimethylcyclohexane and the like. The amount of polymerization initiators can vary widely, but is generally 0.01–5%, preferably 0.02–1%, more preferably 0.03–0.8%, based on the total weight of the monomers.

In carrying out polymerization, there may be used one or more chain transfer agents, for example, alkylmercaptans and alcohols (C1–18), such as lauryl mercaptan.

Polymerization can be carried out at a temperature of usually 30–220° C., preferably 50–200° C., more preferably 70–150° C. Reaction period, which may be varied with other conditions, is usually 1–50 hours, preferably 2–10 hours. Polymerization is generally carried out within an atmosphere of inert gas, such as nitrogen gas.

(l2) Polyalkylene (thio)ethers

Suitable polyalkylene (thio)ethers, include, for example, (co)polymers of one or more of cyclic (thio)ethers as follows:
  (p1) cyclic ethers:
    (p11) (cyclo)alkylene oxides (C2–20), including unsubstituted ones and hydrocarbyl-substituted ones, for example, AOs (C2–8), such as EO, PO, oxetane, 1,2-, 2,3- and 1,3-butylene oxides, THF, 1,2-pentene oxide, trimethyl-EO, tetrahydropyran, 1,2-hexene oxide, tetramethylEO, cyclohexene oxide and 1,2-octene oxide; αolefin oxides (C9–20), such as 1,2-dodecene oxide; aromatic hydrocarbyl-substituted alkylene oxides, such as styrene oxide, α-methylstyrene oxide and 1,1-diphenylEO; and unsaturated (cyclo)aliphatic hydrocarbyl-substituted alkylene oxides, such as butadiene monooxide and vinylcyclohexene monooxide;
    (p12) epihalohydrins, such as epifluorohydrin, epichlorohydrin and epibromohydrin; and
    (p13) glycidyl compounds (C4–20), for example, glycidyl ethers, including (halo)alkyl ethers, alkenyl ethers and aryl ethers, such as butyl glycidyl ether, n-hexyl glycidyl ether, (meth)allyl glycidyl ether, phenyl glycidyl ether and 2-chloroethyl glycidyl ether; and glycidyl esters, such as glycidyl (meth)acrylates and glycidyl acetate; and glycidol; and
  (p2) cyclic thioethers, corresponding to (p1), oxygen atom constituting heterocyclic ether thereof having been substituted with sulfur atom, for example, ethylene sulfide, isobutylene sulfide and styrene sulfide; as well as combinations of two or more of them (random-wise and/or block-wise).

Among these, preferred are AOs (C2–8) and α-olefin oxides (C9–20), particularly EO, PO and combinations of EO and PO. Preferable content of EO is 50–100% based on the total weight of AO.

Other examples of suitable polyalkylene (thio)ethers are polyacetals, such as homopolymers of formaldehyde or trioxane, and copolymers of formaldehyde or trioxane with cyclic ethers (p1) such as EO and PO.

Polyalkylene (thio)ethers (I2) are inclusive of (I2i) unmodified polymers of cyclic (thio)ether(s) and polyacetals; and (I2ii) modified (co)polymers of one or more of cyclic (thio)ethers, obtainable by further modifying (I2i).

Polymers of cyclic (thio)ether(s) include (I2i1) ones obtainable by ring-opening polymerization of one or more cyclic (thio)ethers and (I2i2) ones obtainable by ring-opening addition of cyclic (thio)ether(s) to an active hydrogen atom-containing compound (q).

Ring-opening polymerization of cyclic (thio)ether(s) to prepare (I2i1) can be carried out in the presence of a polymerization catalyst. Suitable catalysts include, for example, reaction products of an organozinc compound (dihydrocarbylzinc, such as diethylzinc) with a polyhydric alcohol or phenol (tri- to penta-methylene glycols, glycerol, pentaerythritol, resorcinol, hydroquinone and the like), in a molar ratio of 0.2/1–1.2/1.

Ring-opening addition of cyclic (thio)ether(s) to prepare (I2i2) can be carried out in the presence of a addition catalyst. Suitable catalysts include, anionic addition polymerization catalysts, including alkaline catalysts, for example, alkali metal hydroxides, such as sodium, potassium and cecium hydroxides, alkali metal alcoholates, such as sodium methylate, sodium butylate, potassium methylate and potassium butylate, and amine catalysts, for example, trialkyl (C1–4) amines, such as triethylamine, trimethylamine and tributylamine; cationic addition polymerization catalysts, for example, chlorides, such as aluminum, antimony, boron, phosphorur, iron, zinc and titanium chlorides, and mineral acids, such as hydrochloric, hydrobromic, sulphric and perchloric acids; coordination anionic addition polymerization catalysts, for example, combinations of a metal alkoxide (such as iron triethoxide) or an alkaline earth metal compound with an active hydrogen compound (such as acetylacetone) or a Lewis acid.

Suitable active hydrogen atom-containing compounds (q) reacted with cyclic (thio)ether(s) to prepare (I2i2) include ones having one or more (usually 1–20, preferably 1–6, more preferably 1–5, particularly 1–3) active hydrogen atoms, such as ones contained in hydroxyl, carboxyl, amino, mercapto and amide groups.

Suitable examples of (g) are as follows:
(q1) alcohols:
straight-chain and branched, aliphatic, cycloaliphatic and aromatic alcohols (C1–30 or more):
(q11) monohydric alcohols, including aliphatic ones, for example, methanol, ethanol, n- and i-propanols, n-, sec-and i-butanols, 2-ethylhexanol, natural fatty alcohols (such as lauryl, stearyl and oleyl alcohols) and synthetic alcohols (such as Ziegler alcohols, oxo alcohols and synthetic secondary alcohols); cycloaliphatic ones, such as cyclohexanol; aromatic ones, such as benzylalcohol and phenethylalcohol; and tertiary amino group-containing monohydric alcohols, such as hydroxyalkyl (C2–4) derivatives (AO adducts) of secondary amines mentioned below in (q41), for example, dialkylalkanolamines, such as diethylethanolamine;

(q12) polyhydric alcohols, including
(q121) dihydric alcohols, for example, straight-chain diols, such as ethylene glycol, 1,3-propanediol, 1,4-butanediol and 1,6-hexanediol; branched aliphatic diols, such as 1,2-propanediol, neopentylglycol, 3-methyl-1,5-pentanediol and 2,2-diethyl-1,3-propanediol; cycloaliphatic diols, such as cyclohexane dimethanol, cyclohexylene glycol, hydrogenated bisphenol A and other alicyclic polyols as mentioned in U.S. Pat. No. 4,990,545, incorporated herein by reference; and aromatic diols, such as xylylene diols;

(q122) higher functionality polyhydric alcohols having 3–8 or more hydroxyl groups, for example, alkane polyols and intermolecular or intramolecular dehydrates thereof, such as glycerol, trimethylolpropane, 1,2,6-hexanetriol, pentaerythritol, sorbitol, polyglycerols (polymerization degree 2–10 or more), dipentaerythritol and sorbitan; and sugars and glycosides, such as glucose, fructose, sucrose and methylglucoside;

(q2) phenols (C6–30 or more):
(q21) monohydric phenols, for example, phenol, mono- and di-hydrocarbyl (C1–18: alkyl, cycloalkyl, aryl or/and aralkyl) phenols, such as cresols, xylenols, p-butylphenol, and mono- and di-nonyl-phenols, cyclohexylphenols, phenylphenols, benzylphenols and styrenated phenols; and condensed nuclear phenols, such as naphthols and phenantrols;

(q22) polyhydric phenols having 2–8 or more hydroxyl groups, for example, mononuclear polyhydric phenols, such as hydroquinone, resorcinol and phloroglucinol; bisphenols, such as bisphenol A, bisphenol S, bisphenol F, halogenated products of them (e.g. tetrabrombisphenol A) and the like, as disclosed in U.S. Pat, No. 4,990,545, incorporated herein by reference;

(q3) carboxylic acids:
aliphatic, cycloaliphatic and aromatic carboxylic acids (C1–40 or more):
(q31) monocarboxylic acids, for example, saturated and unsaturated aliphatic acids, such as acetic, propionic, butyric, octanoic, 2-ethylhexanoic, (meth) acrylic and (iso)crotonic acids, fatty acids (such as lauric, stearic, oleic, linoleic and linolenic acids) and alkoxy (C1–6) acetic acids (such as methoxyacetic acid); and aromatic monocarboxylic acids, such as benzoic, cinnamic and naphthoic acids;

(q32) polycarboxylic acids having 2–8 or more hydroxyl groups, for example, aliphatic ones, including saturated and unsaturated aliphatic dicarboxylic acids, such as oxalic, malonic, succinic, glutaric, ethylsuccinic, adipic, pimelic, suberic, azelaic, sebacic, dodecane dicarboxylic, maleic, fumaric, itaconic, citraconic and mesaconic acids, and polymers (polymerization degree: 2–8 or more) of unsaturated mono- or dicarboxylic acid as above, such as maleic and itaconic acid dimers and (meth)acrylic acid pentamers; cycloaliphatic ones, for example, dicarboxylic acids, such as 1,2- and 1,3-cyclopentanedicarboxylic acids and 1,2-, 1,3-, and 1,4-cyclohexanedicarboxylic acids, and polymerized fatty acids, such as dimer acids and trimer acids (dimers and trimers of unsaturated fatty acids such as linoleic and linolenic acids); aromatic ones, for example, dicarboxylic acids, such as phthalic, isophthalic and terephthalic acids and naphthalenedicarboxylic acids, tri- and tetracarboxylic acids, such as trimellitic and pyromellitic acids;

(q33) hydroxycarboxylic acids having 2–8 or more active hydrogen atoms, for example, aliphatic ones, such as glycolic, lactic, glyceric, mallic, tartaric and ricinoleic acids; and aromatic ones, such as salicylic acid;

(q4) amines: aliphatic, cycloaliphatic, aromatic and heterocyclic, primary and secondary amines (C1–50 or more) containing 1–25 or more nitrogen atoms:

(q41) aliphatic, cycloaliphatic and aromatic monoamines (C1–20 or more), including primary amines, for example, monoalkyl, monoalkenyl, monocycloalkyl, monoaralkyl and monoaryl amines, such as methyl, ethyl, propyl, n-butyl, oleyl, cyclohexyl and benzyl amines, and aniline; secondary amines, for example, dialkylamines, such as diethyl amine and dioleyl amine; and tertiary amino group-containing monoamines, such as N,N-dialkyl (C1–4)-substituted derivatives of polyamines mentioned below in (q42), for example, N,N-dialkylaminoalkylamines, such as N,N-dimethylaminoethylamine;

(q42) polyamines, including aliphatic ones, for example, alkylene diamines (C2–18), polyalkylene (C2–6) polyamines (containing 3–25 amino groups) and alkyl (C1–8)-substituted derivatives of them, such as ethylene diamine, propylene diamine, tetramethylene diamine, hexamethylene diamine, diethylene triamine, dipropylene triamine and N-methylamino-ethylamine; aromatic ones (C6–20), for example, diamines, such as 2,4- and 2,6-tolylene diamines and 4,4'- and 2,4'-diphenylmethane diamines, and higher functionality polyamines, such as polymethylenepolyphenylene polyamines and triphenylmethane triamines; cycloaliphatic diamines (C4–40), such as isophorone diamine, dicyclohexylmethane diamine and dimer diamines (diamines derived from dimer acids); araliphatic diamines (C8–15), such as xylylene diamines; and (q43) aminoalcohols, for example, mono- and di-alkanol (C2–8) amines, such as mono- and di-ethanol and i-propanol amines;

(q5) thiols:
thiols (C1–30 or more) corresponding to (q1), such as ethanethiol, dodecanethiol, phenylmethanethiol, 1,4-butanedithiol; thiols obtainable by reacting thiourea with (q1); and monofunctional to pentafunctional thiols obtainable by reacting sodium hydrosulfide with (p12) such as epichlorohydrin or polymer (dimer to pentamer) thereof;

(q6) amides:
for example, amides of (q3), such as oleamide; and polymers (dimers to pentamers) of unsaturated monocarboxamides, such as (meth)acrylamides;

and combinations of two or more of (q1)–(q6).

Among these, preferred are (q1)–(q4). More preferred are (q2) and particularly (q1) Among (q11) and (q12), preferred are polyhydric alcohols (q12), More preferred are those having 2–3 hydroxyl groups, especially ethylene glycol, 1,2-propanediol and glycerol.

Polymerization degree or addition molar number of cyclic (thio)ether(s) in (i1) or (i2) may be varied widely, for instance, in the range of 5–50,000, but is preferably 10–30,000, particularly 15–20,000.

(I2ii) can be prepared by modifying (I2i) through any known methods.

Suitable modifying methods include, for example, 1) (thio)esterification, 2) (thio)etherification, 3) (thio)urethane-modification, 4) epoxy-modification and 5) aminoalkylation (cyanoalkylation followed by hydrogenation), by reacting hydroxyl or mercapto group(s) of (I2i) with an acid or an ester-forming derivative thereof (r1), with a halide (r2) in the presence of an alkali, with an isocyanate (r3), with a polyepoxide (r4) and with unsaturated nitrile (r5) and then hydrogen, respectively; and 6) grafting or vinyl modification (polymer/monool or polymer/polyol formation), by polymerizing a vinyl monomer (r5) insitu within (I2i); as well as combination of two or more of 1)–6), such as 6) followed by 3); 1), 2), 4) or 5) followed by 3); 1) or 2) followed by 6); and 1) or 2) followed by 6) and then 3).

Suitable acids and ester-forming derivatives (r1) used in (thio)esterification, include, organic ones, for example, carboxylic acids, such as mono- and polycarboxylic acids mentioned above in (q31) and (q32); and anhydrides, acid halides (such as chlorides) and lower alkyl (C1–4) esters of them, such as acetic anhydride, maleic anhydride, benzoyl chloride, adipic dichloride and dimethyl terephthalate; and inorganic ones, for example, sulfuric acid, sulfuric anhydride, chiorosulfonic acid, sulfamic acid, thionyl chloride, phosphoric acid, phosphoric anhydride and phosphorous oxychioride.

Suitable halides (r2) used in (thio)etherification include chlorides, bromides and fluorides (C1–18), including monohalides (r21), for example, straight-chain or branched alkyl or aralkyl halides, such as methyl, ethyl, propyl, octyl, lauryl and benzyl chlorides, and methyl bromide; polyhalides (r22), for example, alkylene dihalides, such as methylene dichloride, dibromomethane, dichloroethane and dibromoethane; and monohaloalkanoic acids, such as monochloroacetic acid. Suitable alkalis include alkali metals, such as sodium, potassium and lithium. (Thio)etherification can be done by reacting hydroxyl or mercapto group(s) of (I2i) with an alkali to form an alcoholate or thiolate, followed by reacting it with (r2) to carry out desalting.

Suitable isocyanates (r3) used in (thio)urethane-modification include mono-isocyanates (r31), for example, straight-chain or branched alkyl, aralkyl or aryl isocyanates (C1–18 (except carbon atoms in NCO group, similarly hereinafter), such as ethyl, octyl, lauryl, benzyl, phenyl, tolyl and naphthyl isocyanates; and poly-isocyanates (r32), for example, aromatic polyisocyanates (C6–20), such as 2,4- and/or 2,6-tolylene diisocyanates, 1,3- and/or 1,4-phenylene diisocyanates, 4,4'- and/or 2,4'-diphenylmethane diisocyanates and polyarylmethane polyisocyanates (e.g. polymethylenepolyphenylene polyisocyanates; cycloaliphatic polyisocyanates (C4–15), such as isophorone diisocyanate, cyclohexylene diisocyanates, methylcyclohexylene diisocyanates and dicyclohexylmethane diisocyanate; aliphatic polyisocyanates (C2–18), such as ethylene diisocyanate, tetramethylene diisocyanate, hexamethylene diisocyanate, trimethylhexamethylene diisocyanate and lysine diisocyanate; araliphatic polyisocyanates (C8–15), such as xylylene diisocyanates; and modified polyisocyanates of these polyisocyanates (such as modified ones containing urethane, carbodiimide, allophanate, urea, biuret, urethdione, urethonimine, isocyanurate and/or oxazolidone groups); as well as mixtures of two or more of them.

Suitable polyepoxides (r4) used in epoxy-modification include epoxy resins include conventionally employed ones, as described in "EPOXY RESINS" published 1957 by McGraw-Hill, for example, glycidyl ethers, including those of phenol or bisphenol ether type [adducts of epichlorhydrin with phenolic compounds, including aromatic diols, such as bisphenols (such as bisphenol A), phenol novolak, cresol novolak, resorcinol and the like], phenol epoxy resins, aromatic epoxy resins, cycloaliphatic epoxy resins, ether type epoxy resins (adducts of epichlorhydrin with polyols, polyether polyols and the like), such as polyol di- and tri-glycidyl ethers, and so on; and modified products of these epoxy resins (such as modified products of epichlorhydrin with bisphenol A). Among these, preferred are adducts of epichlorhydrin with bisphenol A. Epoxy resins usually have an epoxy equivalent of generally 140–4000, preferably 190–500. Illustrative of suitable epoxy resins include commercially available Epikote 1004 (produced by Shell), Araldite 6084 and 7072 (produced by Ciba-Geigy) and AER 664 (produced by Asahi Kasei).

(I2ii) of coupled type can be produced through coupling reaction of two moles or more of (I2i) with a polyfunctional modifier of (q32) or ester-forming derivative thereof, (r22), (r32) or (r4).

With use of monofunctional modifier of (q31) or ester-forming derivative thereof, (r21) or (r31), at least a part of hydroxyl or mercapto end group(s) of (I2i) or coupled (I2i) can be modified to block the end group(s).

Suitable unsaturated nitrites (r5) include (meth) acrylonitriles. Through reaction with (r5), at least a part of hydroxyl or mercapto group(s) of (I2i) or coupled (I2i) can be cyanoalkylated (such as cyanoethylated) and then hydrogenated into (I2ii) of aminoalkylated type.

Suitable vinyl monomers used in grafting or vinyl modification include those mentioned in the above (a)–(n), for example, styrene, (meth)acrylonitriles and mixtures of them. Vinyl monomer(s) can be polymerized insitu in (I2i), usually in the presence of a polymerization initiator, to prepare a polymer/monool or polymer/polyol. Suitable polymerization initiators include the same ones as mentioned above in (II). The resulting polymer/monool or polymer/polyol may contain polymer formed from vinyl monomer(s) in such an amount of usually up to 80%, preferably 10–70%, more preferbly 20–60%.

(I3) Polyurethanes

Suitable polyurethanes are inclusive of reaction products of a polyisocyanate component with a polyol component.

Suitable polyisocyanates include the same ones as the above (r32). Among these, preferred are diisocyanates, particularly aromatic diisocyanates.

Polyols contain usually 2–8 or more (preferably 2–3) hydroxyl groups. Suitable polyols include high molecular weight polyols, having an equivalent weight (molecular weight per hydroxyl group, determined by hydroxyl number) (hereinafter referred to as Eq) of 250–5,000 or more, preferably 500–1,500), such as polyether polyols, polyester polyols, polymer/polyols, polyalkadiene polyols and acrylic polyols; and low molecular weight polyols, having an Eq lower than 250, such as polyhydric alcohols and low molecular weight AO adducts of a compound containing two or more active hydrogen atoms.

Suitable polyhydric alcohols include the same ones as (q5).

Suitable polyether polyols include ones obtainable by ring-opening addition of one or more AOs (C2–20) as mentioned in (p11), such as EO, PO and/or THF, to a compound containing two or more active hydrogen atoms. Suitable compounds containing two or more active hydrogen atoms used to prepatre AO adducts and polyether polyols include polyhydric alcohols, polyhydric phenols, polycarboxylic acids, hydroxycarboxylic acids, primary monoamines, polyamines and polythiols, as mentioned in (q12), (q22), (q32), (q33), (q41), (q42) and (q5). Exemplery of polyether polyols are polyether diols, such as polyethylene glycols, polypropylene glycols, polytetramethyleneether diols, and EO and/or PO adducts of bisphenol A; and branched polyether polyols, such as EO and/or PO adducts of glycerol.

Suitable polyester polyols include, for example, polycondensates of a polycarboxylic acid component with a polyol component, polylactone polyols, castor oil fatty acid esters and polycarbonate polyols.

Suitable polycarboxylic acid components include polycarboxylic acids mentioned above in (q32), and ester-forming derivatives (anhydrides, acid halides and lower alkyl esters) thereof, as mentioned in (r1). Among these, preferred are dicarboxylic acids (particularly aromatic dicarboxylic acid and combination thereof with aliphatic dicarboxylic acid). Examples of suitable polyol components include low molecular weight polyols and polyether polyols as described above and alcoholates (such as sodium alcoholate) of these polyols. Among polyols, preferred are diols (such as ethylene glycol, diethylene glycol, 1,4-butanediol, 1,6-hexanediol, neopentylglycol, polyethylene glycols, polytetramethyleneether glycols, EO and/or PO adducts of bisphenol A) and combination thereof with a minor amount of polyols of 3–8 functionality (such as trimethylol propane, glycerine, pentaerythritol and AO adducts of them).

Polylactone polyols can be produced by ring-opening polymerization of a lactone (C3–12), such as caprolactone, in the presence of a polyol.

Castor oil fatty acid esters include castor oil and transesterification products thereof with a polyol. Polycarbonate polyols can be produced by ring-opening polymerization of an alkylene (C2–4) carbonate, such as ethylene carbonate and propylene carbonate, in the presence of a polyol.

Suitable polyols used in polylactone polyols, transesterification products of castor oil and polycarbonate polyols include low molecular weight polyols and polyether polyols as described above.

Suitable polymer/polyols include those obtainable by polymerizing a vinyl monomer (r5) insitu within a polyol (polyether polyol and/or polyester polyol and optionally lower molecular weight polyol), in the same manner as in the above vinyl-modification of (I2i).

Suitable polyalkadiene polyols include, for example, polybutadiene polyols, such as hydroxyl-terminated (co) polymers of butadiene with or without a minor amount (e.g. 15–25%) of another monomer (e.g. styrene, acrylo-nitrile or the like), having 2–3 hydroxyl groups, and hydrogenated polybutadiene polyols. Suitable acrylic polyols include (co) polymers of (c41) with another monomer, for example, copolymers of hydroxyethyl or hydroxypropyl (meth) acrylate with styrene or (j11) (such as methyl methacrylate or acrylate).

In producing polyurethanes, a polyol component usually comprises a high molecular weight polyol and may contain one or more other active hydrogen atom-containing compounds. Such compounds include, for instance, low molecular weight ones having an Eq (molecular weight per active hydrogen atom-containing group, determined by hydroxyl number and primary and secondary amine number) lower than 250, such as chain-extenders, crosslinkers and chain-terminators, and high molecular weight polyamines (having an Eq of 250–5,000 or more, preferably 500–1,500).

Suitable chain-extenders include low molecular weight diols, for example, dihydric alcohols (q121) and low molecular weight AO adducts of a compound containing two active hydrogen atoms as above; diamines as mentioned in (q42) and ketimines thereof.

Suitable crosslinkers are inclusive of low molecular weight polyols having 3–8 or more hydroxyl groups, for example, polyhydric alcohols (q122) and low molecular weight AO adducts of a compound containing 3–8 active hydrogen atoms as above; trivalent—hexavalent polyamines, for example, polyalkylene polyamines and polymethylene-polyphenylene polyamines as mentioned in (q42), and ketimines thereof.

Suitable chain-terminators include monohydric alcohols, monoamines, and mono- and di-alkanol amines, as mentioned in (q11), (q41) and (q43).

Suitable high molecular weight polyamines include the above mentioned (I2ii) of aminoalkylated type. Polyurethane-urea or polyurea can be produced by substituting at least a part of a high molecular weight polyol with a high molecular weight polyamine.

Amounts of a high molecular weight polyol and a chain-extender and/or a crosslinker can be varied depending upon the resulting polyurethanes. In producing flexible polyurethanes, a chain-extender and/or a crosslinker is used in such an amount of usually 0–10%, preferably 1–5%, based on the total weight of a high molecular weight polyol and a chain-extender and/or a crosslinker. Polyurethanes of high rigidity can be prepared using a chain-extender and/or a crosslinker in a larger amount than the above range, with or without a high molecular weight polyol.

Amount of a chain-terminator can be varied depending upon Mw of the resulting polyurethane.

In producing polyurethanes, the polyisocyanate component and the polyol component are reacted in such a ratio providing an isocyanate index of usually 90–120, preferably 95–110, more preferably 100–105. There may be used larger excess of polyisocyanate component in a ratio providing an isocyanate index of 120 or more, such as 150–5,000, preferably 200–3,000, to produce polyisocyanurates or polyurethanes containing isocyanurate rings.

Polyurethanes may be produced in one step or two or more steps, through one-shot process, or through prepolymer or semi-prepolymer process. In the latter, a prepolymer or a semi-prepolymer (quasi-prepolymer) is prepared by reacting a polyisocyanate with a high molecular weight polyol, followed by reacting the prepolymer with a chain-extender and/or a crosslinker. A chain-terminator may be added at any stages of from prepolymer-producing stage to after chain-extention and/or a crosslinking.

(I4) Polyesters

Suitable polyesters are inclusive of polycondensates of a polycarboxylic acid component with a polyol component and polylactones.

Suitable polyol components and polycarboxylic acid components include those (such as dicarboxylic acid or an ester-forming derivative thereof and a low molecular weight diol or a polyether diol, optionaly a tri-functional or more polyol and/or polycarboxylic acid) as described in the above polyester polyols. Polycondensates may be hydroxyl-terminated, carboxyl-terminated or both. Polyol component and/or polycarboxylic acid component may contain a monohydric alcohol (q11) and/or a monocarboxylic acid (q31) to form polycondensates terminated with (q11) and/or (q31).

Polylactones can be produced by ring-opening polymerization of a lactone (C3–12), such as caprolactone, in the presence of an initiator. Suitable initiators include polyols (low molecular weight polyols and polyether polyols) as described above, and polycarboxylic acids (q32), monohydric alcohol (q11) and a monocarboxylic acid (q31) as mentioned above.

Illustrative of polyesters (I4) are poly(cyclo)-alkylene (C2–6) terephthalates and poly(cyclo)alkylene (C2–6) 2,6-naphthalenedicarboxylates.

(I5) Polyamides

Suitable polyamides include polyamides (nylons) (I5i) and polyetheresteramides (I5ii).

Polyamides (I5i) are inclusive of polycondensates of a dicarboxylic acid with an aliphatic diamine (C3–12), such as nylon 46, nylon 66, nylon 610 and nylon 612; and polyamides obtainable by polymerization of an aminocarboxylic acid (C6–18) or a lactam (C6–18), such as nylon 6, nylon 11 and nylon 12. Suitable dicarboxylic acids and aliphatic diamines include those mentioned in (q32) and (q42). Suitable aminocarboxylic acids include a-aminocaproic, ω-aminoenanthic, ω-aminocaprylic, ω-aminopelargonic, ω-aminocapric, 11-aminoundecanoic and 12-aminododecanoic acids; and suitable lactams include caprolactam, caprylactam and laurolactam.

Polyetheresteramides (I5ii) include, for example, ones obtainable by reacting a polyoxyalkylene diol with a diacrboxylic acid and a diamine, with an aminocarboxylic acid or a lactam, or with carboxyl-containing polyamide (I5i). Suitable polyoxyalkylene diol include ones obtainable by ring-opening addition of one or more AOs as mentioned in (p11) (C2–20, preferably 2–4, such as EO, PO and/or THF, particularly EO) to a-compound containing-two active hydrogen atoms [such as dihydric alcohols, dihydric phenols and primary monoamines, as mentioned in (q121), (q22) and (q41)], for example, polyethylene glycols and EO adducts of bisphenol A. Content of polyoxyalkylene moiety in polyetheresteramides (I5ii) may vary depending upon hydrophylic nature of (I5ii), for instance, up to 90%, preferably 20–80%.

(I6) Polycarbonates

Suitable polycarbonates include ones obtainable from phosgene with a dihydroxyl compound. Suitable dihydroxyl compounds include, for example, aliphatic ones as mentioned in (q121) and aromatic ones as mentioned in (q22), particularly bisphenols such as bisphenol A, bisphenol S and tetrabrombisphenol A.

(I7) Polyphenylene Ethers

Suitable polyphenylene ethers include, for example, poly-2,6-dimethylphenylene ethers, obtainable through oxydative polymerization of 2,6-dimethylphenol using a catalyst such as a Copper-amine complex.

(I8) Polysulfones

Suitable polysulfones include, for example, polyether sulfones, having phenylene groups linked through ether linkages and isopropylidene and sulfone groups, obtainable by polycondensation of dichlorodiphenyl sulfone with bisphenol A.

(I9) Phenolic Resins

Suitable phenolic resins include phenol-aldehyde resins, for example, phenol-formaldehyde resins, including resol and phenolic novolack.

(I10) Xylene Resins

Suitable xylene resins include, for example, ones obtainable addition-condensation of an aldehyde with m-xylene, such as xylene-formaldehyde resins, represented by [—$C_6H_2(CH_3)_2CH_2$—]n, obtainable addition-condensation of formaldehyde with m-xylene using a catalyst such as surfuric acid, and polyether xylene resins modified with phenol, represented by (—$C_6H_2(CH_3)_2CH_2O$)n.

(I11) Urea Resins

Suitable urea resins include urea-aldehyde resins, for example, urea-formaldehyde resins.

(I12) Melamine Resins

Suitable melamine resins include melamine-aldehyde resins, for example, melamine-formaldehyde resins, melamine-benzoguanamine resins, melamine-urea resins.

Polymers (I9), (I10), (I11) and (I12) have a condensation degree n of usually 1.5–15, preferably 2–10.

(I13) Natural Organic Polymers

Suitable natural organic polymers include:

(I13i) carbohydrates and derivatives thereof, for instance, cellulose and derivatives thereof, including cellulose ethers, such as carboxymethylcellulose and salts (such as sodium salt) thereof, carboxymethylethylcellulose, hydroxyalkylcellulose (such as hydroxyethylcellulose and hydroxypropylcellulose) and alkylcellulose (such as methylcellulose and ethylcellulose), and cellulose esters (such as cellulose acetate, cellulose acetate butyrate and nitrocellulose); starch and derivatives thereof, such as esters (e.g. acetate, sulfate and phosphate), ethers (e.g. methyl ether, hydroxyethyl ether and carboxymethyl ether), oxidized starches (such as ones oxidized with hypochlorous acid or periodic acid), dextran and derivatives thereof, such as esters (e.g. acetate, sulfate and phosphate), ethers (e.g. methyl ether, hydroxyethyl ether and carboxymethyl ether) and oxidized dextran (such as dialdehyde dextran), amylose, amylopectin and glycogen; alginic acid and salts (such as sodium alginate); gums (such as xanthan gum, guar gum, gum arabic, gum tragacanth and mesquite gum); chitin and derivatives thereof (such as chitosan); and agar—agar, hyaluronic acid, chondroitin sulfuric acid and peptide glycan;

(I13ii) proteins and derivatives thereof, for example, keratin, collagen, fibroin, elastin, casein, gelatin and enzymes (such as amylase, isoamylase, invertase, pepsin, cellulase, lipase, lactase and glucose oxidase); and (I13i) other natural organic polymers, for instance, natural rubbers, guttapercha, copa, tannin, neucleic acid and lipid.

(I14) Inorganic Polymers

Suitable inorganic polymers include natural and synthetic ones, for example, polyphosphagen, polysiloxane, polyphosphonitrile chloride, synthetic mica and polyphosphoric acid.

In general, polymers (I) have a weight-average molecular weight (hereinafter referred to as Mw) of at least 2,000, preferably 3,000–1,500,000, more preferably 5,000–1,000,000. In the above and hereinafter, Mw is determined by gel permeation chromatography (GPC), under the following conditions.

Equipment: HLC-802 A, produced by Toyo Soda Mfg.
Column: TSK gel GMH 6, produced by Toyo Soda Mfg., 2 colmuns.
Temperature: 40° C.
Sample solution: 0.5% THF solution.
Amount of solution: 200 microlitters.
Detector: Refractometer.
Standard: Polystyrene.

Illustrative examples of polymers (I) include olefinic resins, such as polyethylenes and polypropylenes, acrylic resins, such as poly(meth)acrylates, polyethers, such as polyethylene glycols and polyethylene oxides, polyacetals, polyphenylene oxides, polysulfones, polycarbonates, polyesters and polyamides, as mentioned in U.S. Pat. No. 5,432,224; styrenic resins, polyester resins and polyurethane resins, as described in U.S. Pat. No. 5,238,767; and polyetheresteramides, vinyl resins, copolymers of styrene/(meth)acrylic ester/(meth)-acrylonitrile/butadiene copolymers, polyamide resins, polyester resins, polyacetal resins and polycarbonate resins, as described in U.S. Pat. No. 5,652,326; all incorporated herein by reference.

Among polymers (I), preferred are vinyl polymers (I1) and polyalkylene (thio)ethers (I2); combinations of (I1) with one or more of (I2)–(I14), preferably comprising 5–98% particularly 20–95% of (I1), and combinations of (I2) with one or more of (I3)–(I14), preferably comprising 5–98% particularly 20–95% of (I2). Among vinyl polymers (I1), preferred are acrylonitrile/styrene copolymer and polymethyl methacrylates. Among polyalkylene (thio)ethers (I2), preferred are polyethylene oxides.

In case of using (I13) and/or (I14) with one or more of (I1)–(I12), (I13) and/or (I14) is used in an amount of 2–95% particularly 5–80%, based on the total weight of the polymers.

(A) Electrolytic Solution

Suitable electrolytes; used in electrolytic solutions, to which said polymer (I) in accordance with the present invention is incorporated, include known electrolytes composed of an anion and a cation and mixtures of two or more of them, and can be selected depending upon uses of electrolytic solutions and properties required therefor.

Suitable anion include, for example, perchlorate, tetrafluoroborate, hexafluorophosphate, hexafluoroarsenate, hexafluoroantimonate, perfluoroalkanesulfonates (C1–12) (such as trifluoromethanesulfonate), perfluoroalkane (C1–12) sulfonylimides (such as trifluoromethanesulfonylimide), iodide, tetraalkylborates (having C2–8 alkyl groups; such as tetra-n-butylborate) and aluminum tetrahalides (such as $AlCl_4^-$); as well as other anions of anion-constituting acids as mentioned in U.S. Pat. No. 5,870,275, incorporated herein by reference.

Suitable cations include:

inorganic cations, for instance, alkali metal ions, such as lithium, sodium and potassium ions, alkaline earth metal ions, such as calcium and magnesium ions;

organic cations, for example, quaternary ammonium cations, including tetraalkylammonium (having C1–8 alkyl groups; such as tetramethylammonium, tetraethylammonium, tetrabutyl-ammonium, dimethyldiethylammonium and methyltriethylammonium); quaternary amidinium cations, including imidazolium ions (having C1–8 alkyl groups; such as 1,3-dimethylimid-azolium, 1-ethyl-3-methylimidazolium and 1,2,3-trimethyl-imidazolium), imidazolinium ions (having C1–8 alkyl groups; such as 1,2,3-trimethylimidazolinium, 1,2,3,4-tetramethyl-imidazolinium and 1-ethyl-2,3-dimethyl-imidazolinium) and pyrimidinium ions (having C1–18 alkyl groups; such as 1,3-dimethyl-1,4,5,6-tetrahydro-pyrimidinium, 1,2,3-trimethyl-1,4,5,6-tetrahydro-pyrimidinium, 1-methyl-quaternized 1,8-diazabicyclo [5.4.0] undecene-7 and 1-methyl-quaternized 1,5-diazabicyclo [4.3.0] nonene-5), as well as other cations of quaternized amidine compound mentioned in U.S. Pat. No. 5,870,275, incorporated herein by reference; and quaternary phosphonium cations, including tetraalkylphosphonium (having C1–8 alkyl groups; such as tetramethylphosphonium, tetraethylphosphonium, tetrabutylphosphonium, dimethyldiethylphosphonium and methyltriethylphosphonium.

Illustrative of electrolytes are:

quaternary ammonium salts, for example, tetraalkylammonium tetrafluoroborates, such as tetraethylammonium and methyl-triethylammonium tetrafluoroborates, quaternary amidinium tetrafluoroborates, for example, imidazolium tetrafluoro-borates, such as 1,3-dimethyl-imidazolium, 1-ethyl-3-methylimidazolium and 1,2,3-trimethylimidazolium tetra-fluoroborates, imidazolinium tetrafluoroborates, such as 1,2,3-trimethylimidazolinium, 1,2,3,4-tetramethylimidazolinium and 1-ethyl-2,3-dimethylimidazolinium tetrafluoro-borates, and pyrimidinium tetrafluoroborates, such as 1,3-dimethyl-1,4,5,6-tetrahydropyrimidinium and 1,2,3-trimethyl-1,4,5,6-tetrahydropyrimidinium tetrafluoroborates, 1-methyl-quaternized 1,8-diazabicyclo [5.4.0] undecene-7 tetrafluoroborate and 1-methyl-quaternized 1,5-diazabicyclo [4.3.01] nonene-5 tetrafluoroborate; and quaternary phosphonium tetrafluoroborates, for example, tetraalkylphosphonium tetrafluoroborates, such as tetraethylphosphonium and methyltriethylphosphonium; and perchlorates, hexafluorophosphates, trifluoromethanesulfonates and trifluoromethane-sulfonylimides, corresponding to these tetrafluoroborates; as well as mixtures of these salts.

Among these electrolytes, preferred are quaternary ammonium salts, quaternary amidinium salts and quaternary phosphonium salts, particularly quaternary ammonium salts and quaternary amidinium salts. Among quaternary ammonium salts and quaternary amidinium salts, preferred are those having different alkyl groups, especially methyltriethylammonium salts and 1-ethyl-3-methylimidazolium. Among these salts, more preferred are tetrafluoroborates.

Electrolytic solutions comprises an electrolyte dissolved in a solvent. Suitable solvents include:

1) water;
2) protonic polar solvents:
   alcohols (C1–8 or more), for example, monohydric alcohols, as mentioned in (q11), such as methanol, ethanol, n- and i-propanols, n-, sec-, i- and t-butanols, n-and i-pentanols and benzylalcohol; polyhydric alcohols, as mentioned in (q121) and (q122), such as ethylene glycol (hereinafter referred to as EG), 1,2-propanediol and glycerol; polyethylene glycols, such as diethylene glycol and triethylene glycol (hereinafter referred to as DEG and TEG, respectively); and monoalkyl ethers of glycols (such as EG, DEG and TEG), such as cellosolves (e.g. methyl cellosolve, Cellosolve, butyl cellosolve, isobutyl cellosolve and hexyl cellosolve) and carbitols (e.g. methyl carbitol, Carbitol and butyl carbitol); and
   amides (C1–8 or more), for example, formamides, such as formamide, N-methylformamide, N-ethylformamide, N-propyl-formamide and DMF; and acetamides, such as N-methylacetamide, N-ethylacetamide and N-propyl-acetamide; and
   phenols (C6–12 or more), for instance, those mentioned in (q2), such as phenol, cresols and p-butylphenol;
3) non-protonic polar solvents:
   ethers (C2–18 or more), for example, linear ethers, such as dialkyl ethers (C2–6; e.g. diethyl ether and methyl iso-propyl ether); and dialkyl ethers (C7–12) of glycols (such as EG, DEG and TEG), such as EG dimethyl ether, diethyl carbitol and dibutyl carbitol, DEG dimethyl ether and TEG dimethyl ether; and cyclic ethers (C2–18), for instance, those mentioned in (p11), such as THF; and 1,3-dioxolane, 1,4-dioxane, 4-butyldioxolane and crown ethers (large cyclic ethers of 6-membered to 18-membered ring); amides (C3–8 or more), including linear amides, such as N,N-dimethylacetamide, N,N-diethylacetamide, N,N-dimethyl-propionamide and hexamethylphosphoramide; and cyclic amides, such as N-methylpyrrolidone; lactones (C3–12), such as T-butyrolactone, α-acetyl-γ-butyrolactone (hereinafter referred to as GBL), β-butyrolactone, γ-valerolactone and δ-valerolactone; nitriles (C3–12), such as ACN and acrylonitrile; carbonates (5–14), such as EC, PC, butylene carbonate, DMC and diethyl carbonate; sulfoxides (C2–12), such as DMSO, sulfolane, 3-methyl-sulfolane and 2,4-dimethylsulfolane; and
   carbonyl-containing heterocyclic amino compounds (C4–12), for example, oxazolidinones, such as N-methyloxazolidinone and 3,5-dimethyl-2-oxazolidinone; and imidazolidinones, such as 1,3-dimethyl-2-imidazolidinone; and
4) non-polar solvents:
   hydrocarbon solvents, for instance, aromatic solvents, such as toluene and xylene; paraffinic solvents, such as n-paraffins and iso-paraffins; and the like; as well as mixed solvents of two or more of them, such as mixtures of a lactone with a carbonate and/or an alcohol.

Among these solvents, non-protonic polar solvents, particularly EC, PC, GBL, ACN and mixtures of them are preferred in case of electric double layer capacitors; while GBL, EG and mixtures of them are preferred in case of aluminum electrolytic capacitors.

In view of electrical conductivity and solubility, electrolyte is contained in electrolytic solution preferably in an amount of 5–40%, particularly 10–30%, based on the weight of the electrolytic solution without said polymer (I).

In general, said polymer (I), in accordance with the invention, is incorporated into electrolyte solution, in an amount of at least 0.1%, based on the total weight of the electrolytic solution, to attain an increased electrolyte ion diffusion resistance (R). Said polymer (I) is preferably contained in an amount of not more than 50%, for practical point of view, maintaining sufficient flowability without largely increasing viscosity and liquid resistance of electrolytic solution and resistance of capacitors. Thus, said polymer (I) is contained in an amount of 0.1–50%, preferably 0.2–30%, more preferably 0.5–20%, particularly 5–10%, based on the total weight of the electrolytic solution.

Electrolytic solutions may further contain one or more additives, such as bodying agents, gas absorbents, radical scavengers, decomposition retarder or inhibitors, heat stabilizers, storage or age stabilizers and the like.

Suitable bodying agents include, for example, silicates, such as calcium silicate, sodium silicate, magnesium silicate, aluminum silicate, asbestos, mica, sericite, pyrophyllite, clays, such as kaolin, acid clay, bentonite, montmorillonite and the like. Among these, preferred are bentonite, montmorillonite and particularly sodium silicate, with respect to bodying effects and solubility or dispersibility into electrolytic solutions. Bodying agent(s) can be added in an amount of usually 0.01–10%, preferably 0.1–5%, based on the total weight of the electrolytic solution.

Examples of suitable gas absorbents include fluorocarbons (C5–100), capable of absorbing 5–200 ml of gas per 100 g thereof under conditions of 1 atm. at 25° C., such as "Fultecks" produced by ISC Chemicals, England. In general, gas absorbents) may be added in an amount of usually 0.5–10%, based on the total weight of the electrolytic solution.

Illustrative of suitable the radical scavengers and decomposition retarder or inhibitors are tertiary amines, such as N,N,N',N'-tetramethylethylenediamine, N,N,N',N'-tetramethylnaphthylenediamine and ethyldiphenylamine.

These can be used in an amount of usually 0.5–10%, based on the total weight of the electrolytic solution.

Exemplary of suitable heat stabilizers and storage or age stabilizers are nitrates, such as magnesium nitrate, calcium nitrate and strontium nitrate; and phosphorous acid. These stabilizers may be used in an amount of usually 0.1—1%, based on the total weight of the electrolytic solution.

The total amount of additives) is usually 0.1–10% based on the total weight of the electrolytic solution.

Electrolytic solution (A) containing said polymer (I), in accordance with this invention, has an electrolyte ion difusion resistance (R) higher than an electrolyte ion difusion resistance ($R_o$) of an electrolytic solution ($A_o$) composed of the electrolyte and the solvent without the polymer (I). It is preferred that (A) has an R providing a ratio of R/Ro within the range of 1.01–1,000, particularly 1.1–500. R is higher than $R_o$, preferbly by 10 mΩ–500 Ω or more, particularly by 100 mΩ–500 Ω.

In general, (A) has an R of 1 mΩ–1,000 Ω preferably 10 mΩ–500 Ω.

(A) has an electrolyte ion liquid resistance (LR) providing a ratio of R/LR within the range of generally at least 0.1, preferably 1.0–1,000, particularly 1.0–500.

The electrolyte ion difusion resistances R and $R_o$ and liquid resistance LR are determined in accordance with alternating impedance method, at 25° C. under conditions of bias of 2.5 V and alternating voltage of 5 mV varying alternating frequency from 1 mHz to 20 kHz and carrying out real number-imaginary number analysis called Cole-cole plotting. The alternating impedance method is described, for instance, in "Electro-Chemical Methods-Basic Measurement Manual" (Ohsaka et al, published by Kodansha Scientific), Chapter 11, and "Electro-Chemical Measurement Methods" (Fujishima et al, published by Gihodo Publishing), Chapter 9.

Figure 1:
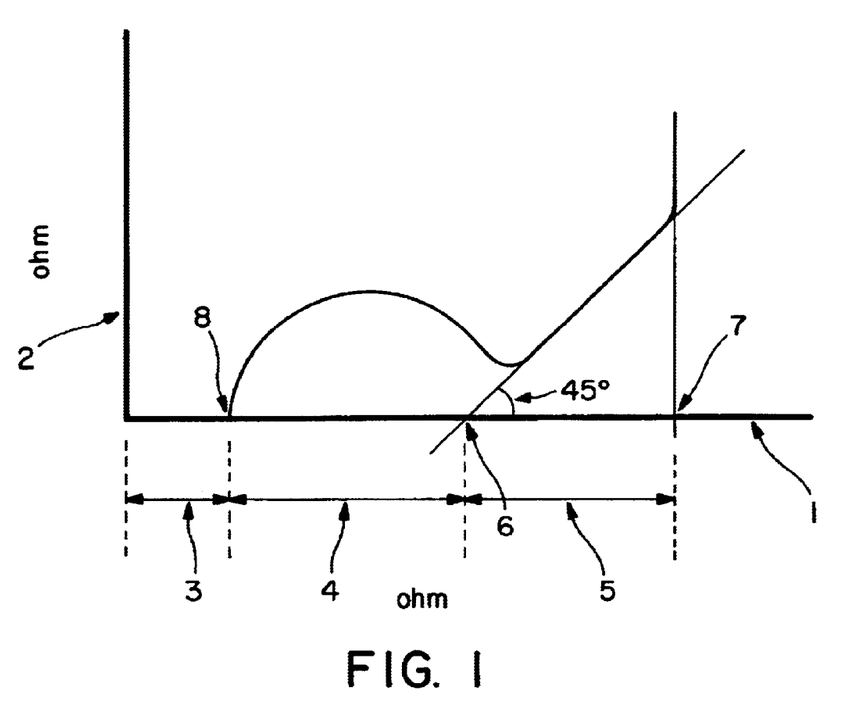
FIG. 1 is a graph showing a Cole—Cole plot, representing real part Z' (resistance) of impedance Z as X-axis and imaginary part Z" (reactance) of impedance Z as Y-axis, used for determination of electrolyte ion diffusion resistance of an electrolytic solution.

As shown in FIG. 1, Cole-cole plot represents resistance (real number component) and reactance (imaginary number component) in the X-axis (abscissa axis) (1) and the Y-axis (ordinate axis) (2), respectively, of the complex area. Difusion resistance is determined by reading the resistance (5) of from the intersection (6) of the tangent line of 45° inclination angle with the X-axis (1) to the intersection (7) of the extrapolated line of the perpendicular part with the X-axis (1). Liquid resistance is determined by reading the resistance (3) up to the intersection (8) of the circular arc with the X-axis (1). Contact resistance is determined by reading the resistance (4) of from the intersection (8) to the intersection (6).

Said electrolytic solution (A) containing said polymer (I), in accordance with this invention, usually have a viscosity of 1–1,000,000 mP•s, preferably 2–100,000 mP•s at 25° C. (A) maintains flowable liquid at a temperature of operation (at the time of applying voltage thereto or at the time of discharge), which temperature can range from −25° C. to 80° C. It is preferred that (A) has a viscosity of at least 1 mP•s at −25° C., for use at a lower temperature of operation; while (A) preferably has a viscosity of not more than 1,000,000 mP•s at 80° C., for use at a higher temperature of operation.

Electric Double Layer Capacitor

Electric double layer capacitors, to which said electrolytic solution (A) according to the invention is applied, include ones comprises a plurality of unit polarizable electrodes, each including a collector layer, a diffusion layer and at least one polarizable electrode layer; an ion permeable, electron-insulating separator interposed between two of said plurality of unit electrodes; a liquid electrolyte saturating at least one of said plurality of unit electrodes; and a sealing member disposed around said two plurality of unit electrodes and said separator.

Suitable polarizable electrodes include, for example, those mainly comprised of activated carbon, graphite or a polyacene organic semi-conductor.

Suitable electric double layer capacitors of this type as well as methods for their preparation are described in U.S. Pat. No. 5,150,283 and U.S. Pat. No. 5,381,303, all incorporated herein by reference.

Electric double layer capacitors, according to the invention, are useful for electro-storage devices, particularly as back-up power source for real time clocks. Real time clocks include, for example, quartz clocks, usually opetated by combined power source of a battery with a condensor.

($A_1$) Electrolytic Solution

Eelectrolytic solution ($A_1$) in another aspect of this invention, comprising an electrolyte, a solvent and a polymer (I) dissolved therein, has an $R_1$ higher than an $R_o$, determined in the same manner as above, using an electric double layer capacitor containing an electrolytic solution between activated carbon electrodes faced each other separated with a separator.

Electrolytic solutions according to this invention are useful not only in electric double layer capacitors but also in other electronic components, such as aluminum electrolytic capacitors, electrochemical capacitors and secondary batteries.

Suitable electronic components are described in U.S. Pat. No. 5,870,275, incorporated herein by reference.

Self-Discharge Suppressing Method

Method for suppressing self-discharge in an electronic component containing an electrolytic solution in still another aspect of the invention, comprises incorporating in the electrolytic solution a polymer (I) to be dissolved therein. Said polymer (I) provides an electrylitc solution ($A_2$) composed of 2% by weight of said polymer (I), 10% by weight of tetraethylammonium tetrafluoroborate and 88% by weight of propylene carbonate and having an electrolytic solution ($A_0$) composed of the electrolyte and the solvent without said polymer (I). $R_2$ and $R_0$ are determined, in the same manner as above using the same capacitor as described in the above ($A_1$).

Having generally described the invention, a more complete understanding can be obtained by reference to certain specific examples, which are included for purposes of illustration only and not intended to be limiting unless otherwise specified.

In the following examples, parts and ratio mean parts by weight and weight ratio, respectively.

Measuring methods, conditions and apparatuses used therefor are as follows:

(1) Viscosity: a Brookfield viscometer (with a BL adapter), mP•s at 25° C.

(2) Conductivity: a conductivity meter CM-40S, produced by Toa Electric Radiation), mS/cm at 30° C.

(3) Diffusion resistance and liquid resistance (Ω): alternating impedance method, Cole-cole plotting with a frequency response analyzer ("Potentiostatt Model 1286 and Model 1253, produced by Solatron Corp.), at 25 ° C. under conditions of bias of 2.5 V and alternating voltage of 5 mV varying alternating frequency from 1 mHz to 20 khZ.

(4) Self-discharge properties:

Direct voltage of 2.8 V is applied to a condenser for 6 hours to charge it, followed by cutting off the circuit and measuring change of voltage with time. Self-discharge properties are evaluated by residual voltage (V) after 50 hours and retention (%) thereof to the initial voltage of 2.8 V.

Example 1

To an electrolytic solution ($A_{o-1}$) prepared by homogeneously dissolving 12 parts of 1-ethyl-3-methyl-imidazolium tetrafluoroborate (hereinafter referred to as $EMIBF_4$) into 86 parts of PC, was added 2 parts of an acrylonitrile/styrene (molar ratio 5/6) copolymer having an Mw of 100,000 (hereinafter referred to as AS) and homogeneously dissolved to obtain a polymer-containing electrolytic solution (A-1) having a viscosity of 7.4 mP·s at 25° C. and a conductivity of 12.3 mS/cm.

An electric double layer capacitor (coin type, diameter: 20 mm, thickness 2.5 mm) was produced by adding this electrolytic solution between activated carbon electrodes faced each other separated with a separator.

Diffusion resistance ($R_1$), liquid resistance (LR) and self-discharge properties of the capacitor were evaluated.

Diffusion resistance ($R_0$) of an electrolytic solution ($A_0$) before adding AS were also determined in the same manner.

The results are shown in Table 1.

Examples 2–4 and Compatative Examples 1 and 2

Example 1 was repeated except varying the composition (parts) of electrolytic solution as shown in Table 1, with or without substituting $EMIBF_4$ with tetraethylammonium tetrafluoroborate (hereinafter referred to as $TEABF_4$) or substituting AS with a polyethylene oxide having an Mw of 20,000 (hereinafter referred to as PEO) or a polymethyl methacrylate having an Mw of 100,000 (hereinafter referred to as PMMA).

The results are shown in Table 1, together with viscosity (mP·s at 25° C.) and conductivity (mS/cm) of each electrolytic solution.

TABLE 1

|  |  | Example | | | | Comparative Example | |
|---|---|---|---|---|---|---|---|
|  |  | 1 | 2 | 3 | 4 | 1 | 2 |
| $EMIBF_4$ | | 12 | 12 | 12 | — | 12 | — |
| $TEABF_4$ | | — | — | — | 10 | — | 12 |
| PC | | 86 | 79 | 86 | 88 | 88 | 88 |
| AS | | 2 | 9 | — | — | — | — |
| PEO | | — | — | 2 | — | — | — |
| PMMA | | — | — | — | 2 | — | — |
| Viscosity | | 7.4 | 120 | 5.5 | 5.3 | 3.5 | 3.4 |
| Conductivity | | 12.3 | 9.2 | 12.9 | 12.5 | 13.0 | 13.0 |
| $R_1$ | | 39 | 400 | 30 | 35 | — | — |
| $R_0$ | | 14 | 14 | 14 | 12 | 14 | 12 |
| LR | | 11 | 15 | 10 | 11 | 10 | 11 |
| $R_1/R_0$ | | 2.8 | 28.6 | 2.1 | 2.9 | 1.0 | 1.0 |
| $R_1/LR$ | | 3.5 | 26.7 | 3.0 | 3.2 | 1.4 | 1.2 |
| Residual | (V) | 1.59 | 2.10 | 1.50 | 1.54 | 1.26 | 1.29 |
| voltage | (%) | 57 | 75 | 54 | 55 | 45 | 46 |

Thus, by using, in an electric double layer capacitor, according to the present invention, an electrolytic solution (A) containing a polymer (I) to give an electrolyte ion diffusion resistance (R) higher than an electrolyte ion diffusion resistance (Ro) without any polymer (I), there have been attained increased dielectric strength and improved retention of residual voltage.

The electric double layer capacitor, in accordance with this invention, exhibits suppressed self-discharge properties because of increased diffusion resistance of electrolyte ions towards neighborhood and/or inner parts of the electrodes, and provides reduced evolution of decomposed gas and reduced change of capacity with time, whereby increased dielectric strength (electrical strength) has been attained. Therefore, the electric double layer capacitor has excellent electrical storage performances, which make it possible to miniaturize outside dimension.

A method for suppressing self-discharge in an electronic component, has been attained by incorporating into the electrolytic solution a polymer (I) according to the invention, whereby rate of electrolyte ions approaching the neighborhood the electrode or rate of electrolyte ions diffusing within the electrodes is reduced to increase diffusion resistance and suppress reaction of electrolyte ions at the electrodes.

What is claimed as new and desired to be secured by Letters Patent is:

1. An electric double layer capacitor, comprising a plurality of unit polarizable electrodes impregnated with an electrolytic solution (A); wherein said electrolytic solution (A) maintains flowable liquid over the range of −25° C. to 80° C. in said capacitor; said electrolytic solution (A) comprising an electrolyte, a solvent and a polymer (I) dissolved therein, said polymer (I) being at least one polymer, having a weight-average molecular weight of at least about 2,000 or a polymerization degree of at least 4, selected from the group consisting of vinyl polymers, polyalkylene ethers, polyurethanes, polyesters, polyamides, polycarbonates, polyphenylene ethers, polysulfones, xylene resins, phenolic resins, urea resins, melamine resins, natural organic polymers and inorganic polymers; said electrolytic solution (A) having an electrolyte ion diffusion resistance (R) higher than an electrolyte ion diffusion resistance ($R_0$) of an electrolytic solution ($A_0$) composed of the electrolyte and the solvent without said polymer (I); the electrolyte ion diffusion resistances R and $R_0$ being determined in accordance with alternating impedance method at 25° C. under conditions of bias of 2.5 V and alternating voltage of 5 mV varying alternating frequency from 1 mHz to 20 k Hz.

2. The capacitor of claim 1, wherein the polymer (I) comprises a vinyl polymer comprised of at least one monomer selected from the group consisting of unsaturated hydrocarbon monomers, carboxyl-containing vinyl monomers, sulfo-containing vinyl monomers, sulfate group-containing vinyl monomers, phosphoric or phosphonic group-containing vinyl monomers, hydroxyl-containing vinyl monomers, nitrogen-containing vinyl monomers, epoxy-containing vinyl monomers, halogen-containing vinyl monomers, vinyl esters, vinyl ethers, vinyl ketones, alkyl (meth)acrylates, polyoxyalkylene moiety-containing vinyl monomers and polyfunctional (meth)acrylates; a polyalkylene ether comprised of at least one cyclic ether monomer containing 2–8 carbon atoms; or a mixture of two or more of them.

3. The capacitor of claim 1, wherein the polymer (I) comprises at least one vinyl polymer comprised of at least one monomer selected from the group consisting of aliphatic vinylic hydrocarbon monomers, cycloaliphatic vinylic hydrocarbon monomers, aromatic vinylic hydrocarbon monomers, amido-containing vinyl monomers, nitrile group-containing vinyl monomers, vinyl esters of a fatty acid containing 2–12 carbon atoms and alkyl (meth) acrylates containing 1–20 carbon atoms in the alkyl group.

4. The capacitor of claim 1, wherein the electrolytic solution (A) has an R providing a ratio of $R/R_0$ within the range of 1.01–1,000.

5. The capacitor of claim 1, wherein the electrolytic solution (A) has an R within the range of 1 mΩ–1,000 Ω.

6. The capacitor of claim 1, wherein the electrolytic solution (A) has an electrolyte ion liquid resistance (LR) providing a ratio of R/LR within the range of 1.0–1,000.

7. The capacitor of claim 1, wherein the electrolytic solution (A) contains said polymer (I) in an amount of 0.1–50% by weight.

8. The capacitor of claim 1, wherein the electrolyte comprises at least one selected from the group consisting of quaternary ammonium salts, quaternary amidinium salts and quaternary phosphonium salts.

9. The capacitor of claim 1, which further comprises an inorganic thickener.

10. The capacitor of claim 1, wherein the solvent comprises at least one solvent selected from the group consisting of water, proton-containing polar organic solvents and non-proton polar organic solvents.

11. The capacitor of claim 1, wherein the electrolytic solution (A) contains the electrolyte in an amount of 5–40% by weight based on the total weight of the electrolyte and solvent.

12. The capacitor of claim 1, wherein the electrolytic solution (A) has a viscosity of 1–1,000,000 mP·s at 25° C.

13. The capacitor of claim 1, wherein the electrodes are mainly comprised of activated carbon, graphite or a polyacene organic semi-conductor.

14. A real time clock, having a back-up electric source comprising a capacitor according to claim 1.

15. An electrolytic solution ($A_1$), wherein said electrolytic solution ($A_1$) maintains flowable liquid over the range of $-25°$ to $80°$ C. in said capacitor, which comprises an electrolyte, a solvent and at least one polymer (I) dissolved therein having a weight-average molecular weight of at least about 2,000 or a polymerization degree of at least 4;

said electrolyte comprising at least one selected from the group consisting of quaternary ammonium salts, quaternary amidinium salts and quaternary phosphonium salts;

said polymer (I) comprising a member selected from the group consisting of a vinyl polymer, a polyalkylene ether, a polyurethane, a polyester, a polyamide, a polycarbonate, a polyphenylene ether, a polysulfone, a xylene resin, a phenolic resin, a urea resin, a melamine resin, a natural organic polymer, an inorganic polymer or a mixture of two or more of these; said vinyl polymer being comprised of at least one monomer selected from the group consisting of vinylic hydrocarbon monomers, carboxyl-containing vinyl monomers, sulfo-containing vinyl monomers, sulfate group-containing vinyl monomers, phosphoric or phosphonic group-containing vinyl monomers, hydroxyl-containing vinyl monomers, nitrogen-containing vinyl monomers, epoxy-containing vinyl monomers, halogen-containing vinyl monomers, vinyl esters, vinyl ethers, vinyl ketones, alkyl (meth)acrylates, polyoxyalkylene moiety-containing vinyl monomers and polyfunctional (meth)acrylates; said polyalkylene ether being comprised of at least one cyclic ether monomer containing 2–8 carbon atoms;

said electrolytic solution ($A_1$) having an electrolyte ion diffusion resistance ($R_1$) higher than an electrolyte ion diffusion resistance ($R_0$) of an electrolytic solution ($A_0$) composed of the electrolyte and the solvent without said polymer (I); the electrolyte ion diffusion resistances $R_1$ and $R_0$ being determined, with use of an electric double layer capacitor containing an electrolytic solution between activated carbon electrodes faced each other separated with a separator, in accordance with alternating impedance method at 25° C. under conditions of bias of 2.5 V and alternating voltage of 5 mV varying alternating frequency from 1 mHz to 20 k Hz.

16. The electrolytic solution of claim 15, which has a viscosity of at least 0.1 mP·s at $-25°$ C. and not more than 1,000,000 mP·s at 80'C.

17. In an electric double layer capacitor, comprising a plurality of unit polarizable electrodes impregnated with an electrolytic solution, the improvement comprising using the electrolytic solution ($A_1$) according to claim 15.

18. The capacitor of claim 17, wherein said electrolytic solution ($A_1$) has an R providing a ratio of $R/R_0$ within the range of 1.01–1,000.

19. The capacitor of claim 17, wherein said electrolytic solution ($A_1$) has an R within the range of 1 m ohms –1,000 ohms.

20. The capacitor of claim 17, wherein said electrolytic solution ($A_1$) has an electrolyte ion liquid resistance (LR) providing a ratio of R/LR within the range of 1.0–1,000.

21. The capacitor of claim 17, wherein the electrodes are mainly comprised of activated carbon, graphite or a polyacene organic semiconductor.

22. In an electronic component containing an electrolytic solution, the improvement comprising using the electrolytic solution ($A_1$) according to claim 15, whereby self-discharge is suppressed.

23. In an real time clock, having a back-up electric source comprising a capacitor comprising a plurality of unit polarizable electrodes impregnated with an electrolytic solution the improvement comprising using the electrolytic solution according to claim 15.

24. The electrolytic solution ($A_1$) of claim 15, wherein said polymer (I) comprises a vinyl polymer comprised of at least one monomer selected from the group consisting of unsaturated hydrocarbon monomers, carboxyl-containing vinyl monomers, sulfo-containing vinyl monomers, sulfate group-containing vinyl monomers, phosphoric or phosphonic group-containing vinyl monomers, hydroxyl-containing vinyl monomers, nitrogen-containing vinyl monomers, epoxy-containing vinyl monomers, halogen-containing vinyl monomers, vinyl esters, vinyl ethers, vinyl ketones, alkyl (meth)acrylates, polyoxyalkylene moiety-containing vinyl monomers and polyfunctional (meth)acrylates; a polyalkylene ether comprised of at least one cyclic ether monomer containing 2–8 carbon atoms; or a mixture of two or more of them.

25. The electrolytic solution ($A_1$) of claim 15, wherein said polymer (I) comprises at least one vinyl polymer comprised of at least one monomer selected from the group consisting of aliphatic vinylic hydrocarbon monomers, cycloaliphatic vinylic hydrocarbon monomers, aromatic vinylic hydrocarbon monomers, amide-containing vinyl monomers, nitrile group-containing vinyl monomers, vinyl esters of a fatty acid containing 2–12 carbon atoms and alkyl (meth)acrylates containing 1–20 carbon atoms in the alkyl group.

26. The electrolytic solution ($A_1$) of claim 15, which contains said polymer (I) in an amount of 0.1–50% by weight.

27. The electrolytic solution ($A_1$) of claim 15, which further comprises an inorganic thickener.

28. The electrolytic solution ($A_1$) of claim 15, wherein the solvent comprises at least one solvent selected from the group consisting of water, proton-containing polar organic solvents and non-proton polar organic solvents.

29. The electrolytic solution ($A_1$) of claim 15, which contains the electrolyte in an amount of 5–40% by weight based on the total weight of the electrolyte and the solvent.

30. The electrolytic solution ($A_1$) of claim 15, which has a viscosity of 1—1,000,000 mP·s at 25° C.

31. A method for suppressing self-discharge in an electronic component containing an electrolytic solution, which method comprises incorporating in the electrolytic solution a polymer (I) dissolved therein, said polymer (I) being at least one polymer, having a weight-average molecular weight of at least about 2,000 or a polymerization degree of at least 4, and selected from the group consisting of vinyl polymers, polyalkylene ethers, polyurethanes, polyesters, polyamides, polycarbonates, polyphenylene ethers, polysulfones, xylene resins, phenolic resins, urea resins, melamine resins, natural organic polymers and inorganic polymers;

said polymer (I) providing an electrolytic solution ($A_2$) composed of 2% by weight of said polymer (I), 10% by weight of tetraethylammonium tetrafluoroborate and 88% by weight of propylene carbonate and having an electrolyte ion diffusion resistance ($R_2$) higher than an electrolyte ion diffusion resistance ($R_0$) of an electrolytic solution ($A_0$) composed of the electrolyte and the solvent without said polymer (I); the electrolyte ion diffusion resistances $R_2$ and $R_0$ being determined, with use of an electric double layer capacitor containing an electrolytic solution between activated carbon electrodes faced each other separated with a separator, in accordance with alternating impedance method at 25° C. under conditions of bias of 2.5 V and alternating voltage of 5 mV varying alternating frequency from 1 mHz to 20 k Hz.

32. The method of claim 31, wherein the polymer (I) comprises a vinyl polymer comprised of at least one monomer selected from the group consisting of aliphatic vinylic hydrocarbon monomers, cycloaliphatic vinylic hydrocarbon monomers, aromatic vinylic hydrocarbon monomers, amido-containing vinyl monomers, nitrile group-containing vinyl monomers, vinyl esters of a fatty acid containing 2–12 carbon atoms and alkyl (meth)acrylates containing 1–20 carbon atoms in the alkyl group; a polyalkylene ether comprised of at least one alkylene oxide containing 2–8 carbon atoms; or a mixture of two or more of them.

33. The method of claim 31, wherein the electronic component is selected from the group consisting of an electric double layer capacitor, an aluminum electrolytic capacitor, an electrochemical capacitor and a secondary battery.

34. In an electronic component containing an electrolytic solution, the improvement comprising incorporating in the electrolytic solution a polymer (I) dissolved therein, whereby self-discharge is suppressed; said polymer (I) being at least one polymer, having a weight-average molecular weight of at least about 2,000 or a polymerization degree of at least 4, selected from the group consisting of vinyl polymers, polyaklkylene ethers, polyurethanes, polyesters, polyamides, polycarbonates, polyphenylene ethers, polysulfones, xylene resins, phenolic resins, urea resins, melamine resins, natural organic polymers and inorganic polymers;

said polymer (I) providing an electrolytic solution ($A_2$) composed of 2% by weight of said polymer (I), 10% by weight of tetraethylammonium tetrafluoroborate and 88% by weight of propylene carbonate and having an electrolyte ion diffusion resistance ($R_2$) higher than an electrolyte ion diffusion resistance ($R_0$) of an electrolytic solution ($A_0$) composed of the electrolyte and the solvent without said polymer (I); the electrolyte ion diffusion resistance $R_2$ and $R_0$ being determined, with use of an electric double layer capacitor containing an electrolytic solution between activated carbon electrodes faced each other separated with a separator, in accordance with alternating impedance method at 25° C. under conditions of bias of 2.5 V and alternating voltage of 5 mV varying alternating frequency from 1 mHz to 20 kHZ.

35. The electronic component of claim 34, wherein said polymer (I) comprises a vinyl polymer comprised of at least one monomer selected from the group consisting of aliphatic vinylic hydrocarbon monomers, cycloaliphatic vinylic hydrocarbon monomers, aromatic vinylic hydrocarbon monomers, amido-containing vinyl monomers, nitrile group-containing vinyl monomers, vinyl esters of a fatty acid containing 2–12 carbon atoms and alkyl (meth) acrylates containing 1–20 carbon atoms in the alkyl group; a polyalkylene ether comprised of at least one alkylene oxide containing 2–8 carbon atoms; or a mixture of two or more of them.

36. The electronic component of claim 34, which is selected from the group consisting of an electric double layer capacitor, an aluminum electrolytic capacitor, an electrochemical capacitor and a secondary battery.

* * * * *

UNITED STATES PATENT AND TRADEMARK OFFICE
CERTIFICATE OF CORRECTION

PATENT NO.   : 6,621,684 B2
DATED        : September 16, 2003
INVENTOR(S)  : Hideki Shimamoto et al.

It is certified that error appears in the above-identified patent and that said Letters Patent is hereby corrected as shown below:

<u>Title page,</u>
Item [73], Assignee, please delete "Insustrial" and insert -- Industrial --.

<u>Column 26,</u>
Line 9, please delete "80'C" and insert -- 80ºC --.
Line 31, please insert -- , -- after the word "solution".

Signed and Sealed this

Ninth Day of December, 2003

JAMES E. ROGAN
*Director of the United States Patent and Trademark Office*